(12) United States Patent
Gardetto (10) Patent No.: US 8,196,629 B2
(45) Date of Patent: Jun. 12, 2012

(54) RUN-FLAT SUPPORT SYSTEM FOR A PNEUMATIC TIRED WHEEL AND METHOD FOR INSTALLING SAME

(75) Inventor: William W. Gardetto, Colleyville, TX (US)

(73) Assignee: Dynamic Runflats, Inc., Indian Land, SC (US)

( * ) Notice: Subject to any disclaimer, the term of this patent is extended or adjusted under 35 U.S.C. 154(b) by 59 days.

(21) Appl. No.: 12/434,614

(22) Filed: May 1, 2009

(65) Prior Publication Data

US 2010/0116397 A1    May 13, 2010

Related U.S. Application Data

(60) Provisional application No. 61/049,732, filed on May 1, 2008.

(51) Int. Cl.
    *B60C 17/04*    (2006.01)
(52) U.S. Cl. .......... 152/401; 152/516; 152/520
(58) Field of Classification Search .......... 152/400, 152/401, 516, 520
    See application file for complete search history.

(56) References Cited

U.S. PATENT DOCUMENTS

| | | |
|---|---|---|
| 1,170,225 A | 2/1916 | Dillmore |
| 2,165,810 A | 7/1939 | Paselk |
| 2,844,180 A | 7/1958 | Omeron |
| 2,989,108 A | 6/1961 | Gore |
| 3,025,898 A | 3/1962 | Opel |
| 3,028,900 A | 4/1962 | Lee |
| 3,645,312 A * | 2/1972 | Kolodziej .......... 152/158 |
| 3,828,836 A | 8/1974 | Bradley |
| 3,968,825 A | 7/1976 | Mitchell et al. |
| 4,059,138 A | 11/1977 | Mirtain et al. |
| 4,085,786 A | 4/1978 | Caravito |
| 4,157,107 A | 6/1979 | Cataldo |
| 4,169,496 A | 10/1979 | Cataldo |
| 4,183,388 A | 1/1980 | Cassidy |
| 4,202,393 A | 5/1980 | Ikeda et al. |
| 4,257,467 A | 3/1981 | Van der Burg |
| 4,281,700 A | 8/1981 | Ross |

(Continued)

FOREIGN PATENT DOCUMENTS

EP    0490585    6/1992

(Continued)

OTHER PUBLICATIONS

"Servicing Multi-Piece and Single Piece Rim Wheels". Occupational Safety and Health Standards Subpart N, Materials Handling and Storage, No. 1910.177 (6 pages).

*Primary Examiner* — Kip T Kotter
(74) *Attorney, Agent, or Firm* — Choate, Hall & Stewart LLP (57) ABSTRACT

A run-flat support system and method for installing the same are disclosed. In one embodiment, the run-flat support system includes a torque assembly removably coupled to a split wheel rim of a pneumatic tired wheel. Support segments are adapted for attachment to the torque assembly in order to support the pneumatic tired wheel in a flat condition such as an under-inflated condition or deflated condition. Lateral support structures, which may include the form of a wedge, are secured to the support segments to provide a bead lock between beads of the interior side walls of the pneumatic tired wheel and the split wheel rim.

23 Claims, 7 Drawing Sheets

U.S. PATENT DOCUMENTS

| | | |
|---|---|---|
| 4,346,747 A | 8/1982 | Osada et al. |
| 4,424,842 A | 1/1984 | Trebaol |
| 4,428,411 A | 1/1984 | Markow et al. |
| 4,572,260 A | 2/1986 | Ordu |
| 4,573,509 A | 3/1986 | Smith et al. |
| 4,673,014 A | 6/1987 | Markow |
| 4,709,738 A | 12/1987 | Goodell et al. |
| 4,794,966 A | 1/1989 | Markow |
| 4,823,854 A | 4/1989 | Payne et al. |
| 4,854,356 A | 8/1989 | Koutsoupidis |
| 5,000,241 A | 3/1991 | Patecell |
| 5,012,849 A | 5/1991 | Ko |
| 5,215,137 A | 6/1993 | Weeks et al. |
| 5,479,976 A * | 1/1996 | Cho .......... 152/518 |
| 5,660,653 A | 8/1997 | Gardetto |
| 5,772,805 A | 6/1998 | Bobst |
| 6,109,319 A | 8/2000 | Gardetto |
| 6,523,587 B2 | 2/2003 | Gregory |
| 6,705,368 B2 * | 3/2004 | Glinz et al. .......... 152/400 |
| 7,264,031 B2 * | 9/2007 | Clouet .......... 152/520 |
| 7,347,241 B2 * | 3/2008 | Gardetto .......... 152/396 |
| 7,503,362 B2 * | 3/2009 | Chandler et al. .......... 152/516 |
| 7,575,030 B2 * | 8/2009 | Resare et al. .......... 152/516 |
| 2005/0115656 A1 * | 6/2005 | Hsieh et al. .......... 152/520 |
| 2005/0217781 A1 | 10/2005 | Gardetto |
| 2008/0149247 A1 * | 6/2008 | Heuze et al. .......... 152/520 |
| 2008/0163968 A1 * | 7/2008 | Gardetto .......... 152/520 |
| 2010/0071824 A1 * | 3/2010 | Gardetto .......... 152/520 |
| 2010/0147428 A1 * | 6/2010 | Lipper .......... 152/399 |

FOREIGN PATENT DOCUMENTS

| | | |
|---|---|---|
| EP | 0569710 | 11/1993 |
| JP | 58185305 A * | 10/1983 |
| JP | 06183225 A * | 7/1994 |

* cited by examiner

RUN-FLAT SUPPORT SYSTEM FOR A PNEUMATIC TIRED WHEEL AND METHOD FOR INSTALLING SAME

PRIORITY STATEMENT & CROSS-REFERENCE TO RELATED APPLICATIONS

This application claims priority from provisional U.S. Patent Application No. 61/049,732, entitled "Run-flat Support System for a Pneumatic Tired Wheel and Method for Installing Same" and filed on May 1, 2008, in the name of William W. Gardetto; which is hereby incorporated by reference for all purposes.

TECHNICAL FIELD OF THE INVENTION

This invention relates, in general, to pneumatic tires for on and off road vehicles and, in particular, to a run-flat support system having a torque assembly for a pneumatic tired wheel and a method for installing the same that supports a tire in a deflated and run-flat condition.

BACKGROUND OF THE INVENTION

Pneumatic tired wheels are widely used in virtually all types of land vehicles, including automobiles, trucks, trailers, tractors, and other self propelled and unpowered vehicles, and aircraft landing gear. The intense development activities involving pneumatic tired wheels and tires has resulted in a highly developed state of the art with respect to tire design, composition, function and reliability.

The performance of pneumatic or gas charged tires is substantially degraded by the loss of inflation pressure. Various attempts have been made to eliminate loss of charge pressure due to tire wall puncture and provide tire designs that will enable the tire to continue to operate in a deflated or "run-flat" condition ranging from modification of tire design to introduction of materials and devices within the tire cavity to support the tire during a deflation period.

These efforts have only been partially successful and often result in limited mobility and loss of steering control and traction, serving to provide mobility for relatively short distances with further destruction of the damaged tire. Further advantages sought for these run-flat adaptations are to provide a replacement for the spare tire and eliminate the need for "on road" changing of the tire. Accordingly, efforts have been directed towards providing vehicle wheels with "run-flat" support devices that better provide vehicle stability and mobility for longer duration and quality of function.

A variety of devices have been developed that may be installed on a pneumatic tired wheel within the tire pressure cavity to support the tire when it is partially or completely deflated without substantially reducing the wheel's effective diameter so that the vehicle stability and control is not compromised. Some of these devices include single and multi-part cushion members that are disposed on the wheel rim between the tire-bead flanges and extend radially outward from wheel axis of rotation to support the tire in a deflated condition. Some of these conventional devices have been fabricated of resilient elastomeric materials of relatively complex construction and may be stretched over the wheel rim to mount on unitary or multi-part rims.

Such devices, if stiff enough to support a tire under run-flat conditions, are difficult to mount on split wheel rims due to the difference in diameter between the tire bead flanges and the interconnecting rim center portion or web. On the other hand, if these devices are resilient enough to be slipped over the bead flanges and engaged with the wheel rim in a static condition, they tend to slip and lose their support position during high speed operation due to centrifugal forces acting thereon.

Some run-flat devices have been equipped with clamps to achieve position maintenance but suffer the difficulty of placement and replacement due to the necessary tight fit against the wheel. Others have been provided with projections on the inner surface of the support structure to maintain wheel contact. These also may be displaced during motion and or involve difficult mounting procedures due to the need to stretch over the wheel rim.

Other multi-component structural inserts have been bolted directly to the wheel via bolts, requiring additional bolt holes drilled into the wheel flange, potentially compromising wheel strength and integrity. The use of multi-component insert structures lessens the difficulty of introduction and/or removal of the structures into the wheel/tire cavity. However, use of "through the wheel" bolt anchors limits the number of bolts that can be anchored in the greater diameter insert structural material resulting in high load strain on the bolts within the structural insert member. Accordingly, further improvements in the field of run-flat support systems are required.

SUMMARY OF THE INVENTION

A run-flat support system and method for installing the same are disclosed. The run-flat support system may be installed on a pneumatic tired wheel within the tire pressure cavity to support the tire when it is partially or completely deflated without substantially reducing the wheel effective diameter so that the vehicle stability and control is not compromised and the vehicle operated with the tire deflated.

In one embodiment, the run-flat support system includes a torque assembly removably coupled to a split wheel rim of a pneumatic tired wheel. Support segments are adapted for attachment to the torque assembly in order to support the pneumatic tired wheel in a flat condition such as an under-inflated condition or deflated condition. Lateral support structures, which may include the form of a wedge, are coupled to the support segments to provide a bead lock between beads of the interior side walls of the pneumatic tired wheel and the split wheel rim.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
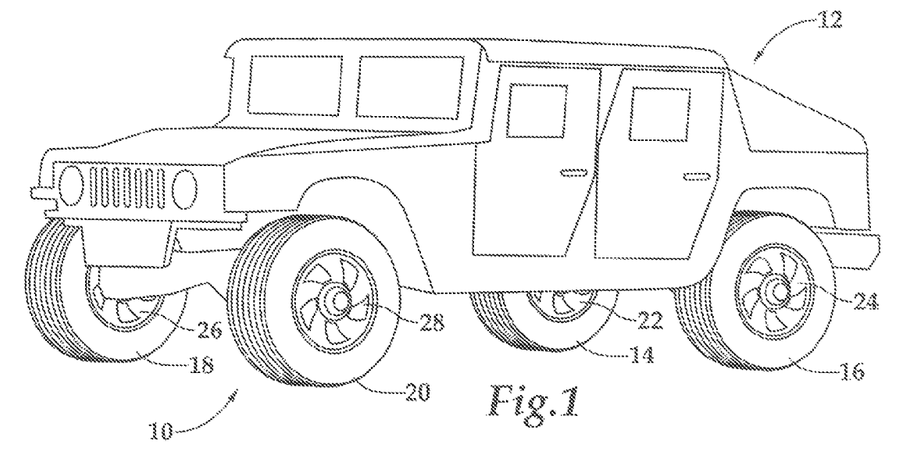
FIG. 1 is a front perspective view of one embodiment of a High Mobility Multipurpose Wheeled Vehicle (HMMWV), which is also known as a "Humvee", utilizing one embodiment of a run-flat support system.

Referring initially to FIG. 1, therein is depicted one embodiment of a run-flat support system that is schematically illustrated and generally designated 10 being utilized on an HMMWV 12. The HMMWV 12 is a light, highly mobile, diesel-powered, four-wheel-drive vehicle equipped with an automatic transmission. Using various common components and kits, the HMMWV 12 can be configured as a troop carrier, armament carrier, S250 shelter carrier, ambulance, TOW missile carrier, or a Scout vehicle, for example.

As illustrated, the HMMWV 12 is outfitted as a troop carrier that is extremely effective in difficult terrain regardless of road type or weather conditions. A V8, 6.2 liter displacement, fuel injection engine transfers power to drive axles and onto pneumatic tired wheels that include rear tires 14 and 16 and front tires 18 and 20 which are mounted onto split wheel rims 22, 24, 26, and 28, respectively. In one embodiment, the tires 14, 16, 18, 20 are 37×12.50R 16.5LT radial tires and the split wheel rims 22, 24, 26, 28 are each of a two wheel half-section design having a diameter of approximately 16.5 inches. Each tire 14, 16, 18, and 20 includes a run-flat support system to enable operation in a flat condition, i.e., when a tire is an under-inflated or deflated condition. The run-flat support system includes a positive locking torque assembly, which is preferably ring-shaped, that mechanically fastens support segments to the wheel rim, thereby increasing traction and braking during a run flat condition. Additionally, the run-flat support system provides better balance and concentricity during long periods of inflated use.

It should be appreciated that although the run-flat support system 10 is illustrated as being utilized by an HMMWV in FIG. 1, the run-flat support system described herein may be utilized in a variety of vehicles. The run-flat support system 10 described herein may be utilized with virtually all types of land vehicles, including automobiles, trucks, trailers, tractors, and other self propelled and unpowered vehicles, and aircraft landing gear. Moreover, it should be appreciated that tires of all sizes including both radial ply and bias ply tires as well as wheel rims of all sizes are within the teachings of the present invention. A general discussion of run-flat support systems and their applicability may be found in either of the following United States Patents: U.S. Pat. No. 5,660,653 entitled "Run-flat Support for Pneumatic Tired Wheel" and issued on Aug. 26, 1997 in the name of William W. Gardetto; U.S. Pat. No. 6,109,319 entitled "Run-flat Support for Pneumatic Tired Wheel" and issued on Aug. 29, 2000 in the name of William W. Gardetto; or U.S. Pat. No. 7,347,241 entitled "Run-flat Support System for a Pneumatic Tired Wheel and Method for Installing Same" and issued on Mar. 25, 2008 in the name of William W. Gardetto; all of which are hereby incorporated by reference for all purposes.

Referring now to FIG. 2 through FIG. 6, therein is depicted one embodiment of the run-flat support system 10 including lateral support structures, which may be individually or collectively referred to as lateral support structure(s) 30. In addition to the lateral support structures 30a through 30f, a torque assembly 32, a split wheel rim as represented by rims 34 and 36, three support segments 38a, 38b, and 38c, and various fasteners 42. When assembled, these components are installed to provide run-flat capability to the pneumatic tired wheel 20 and the cavity 43 therein.

The torque assembly 32 includes a substantially circular body 44 having multiple mounting holes 46 therethrough. In one implementation, the circular body 44 is approximately 16" in diameter and includes 12 evenly spaced mounting holes 46. The mounting holes 46 provide for the attachment of the torque assembly 32 to rims 34 and 36. A peripheral flange 48 is coupled to an outer edge of the substantially circular body 44. In one implementation, the substantially circular body 44 and the peripheral flange 48 are integral. A series of coupling holes 50 are spaced around the peripheral flange 48 for fastening the support segments 38a, 38b, and 38c to the torque assembly 32. In one implementation, 16 evenly spaced coupling holes are used to provide 8 coupling holes per π radians of peripheral flange 48. The peripheral flange 48 is grooved to seat an "O" ring seal 51 that provides a substantially airtight pneumatic cavity. Further, an edge 52 has a shape that complements rim 34 to ensure a formed fit.

The rim 34 includes a body 54 and a drop-center surface 56 that accepts the edge 52 of torque assembly 32 so that a flush fit is formed therebetween. Mounting studs 58 extend from body 54. Preferably, a one-to-one correspondence exits between mounting holes 46 and mounting studs 58 such that equal numbers of mounting holes 46 and mounting studs 58 are present and the mounting studs 58 are spaced to mate with the mounting holes 46.

The rim 36 includes a body 60 having mounting holes and 64 therethrough. Mounting holes 62 correspond to mounting studs 58 such that torque assembly 32 via mounting holes 46 is interposed between rims 34 and 36. Mounting holes 64 provide for the attachment of the run-flat support system 10 to an axle of a vehicle.

Support segments 38a, 38b, and 38c are adapted for attachment to the torque assembly 32 in order to provide support for the pneumatic tired wheel during a flat condition. With respect to support segment 38a, a body 66A of sufficient hardness is included to maintain shape under load. Inner radial surface 68a of support segment 38a conforms to peripheral flange 48 and includes coupling holes 70a therethrough. The coupling holes 70a are spaced to align with coupling holes 50 of torque assembly 32 such that fasteners 42 may be employed to secure the support segment 38a to the torque assembly 32. A crown member 72a of the body 66a is opposite the inner radial surface 68a. In operation, the crown member 72a engages an inner wall of the pneumatic tired wheel during a flat condition to support the wheel and associated load to provide continued mobility.

Figure 5:
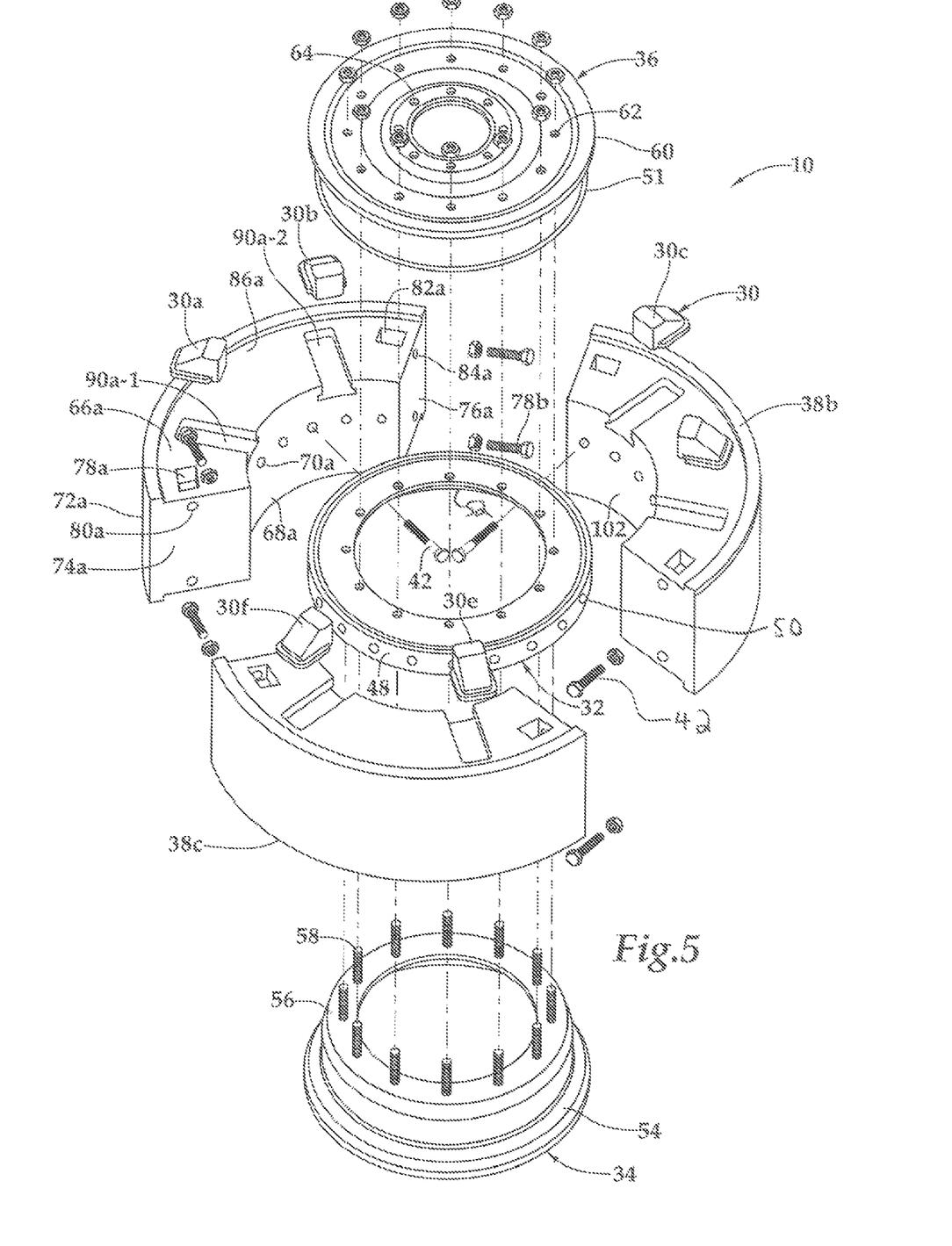
FIG. 5 is an exploded perspective view of the run-flat support system presented in FIG. 3.
Figure 6:
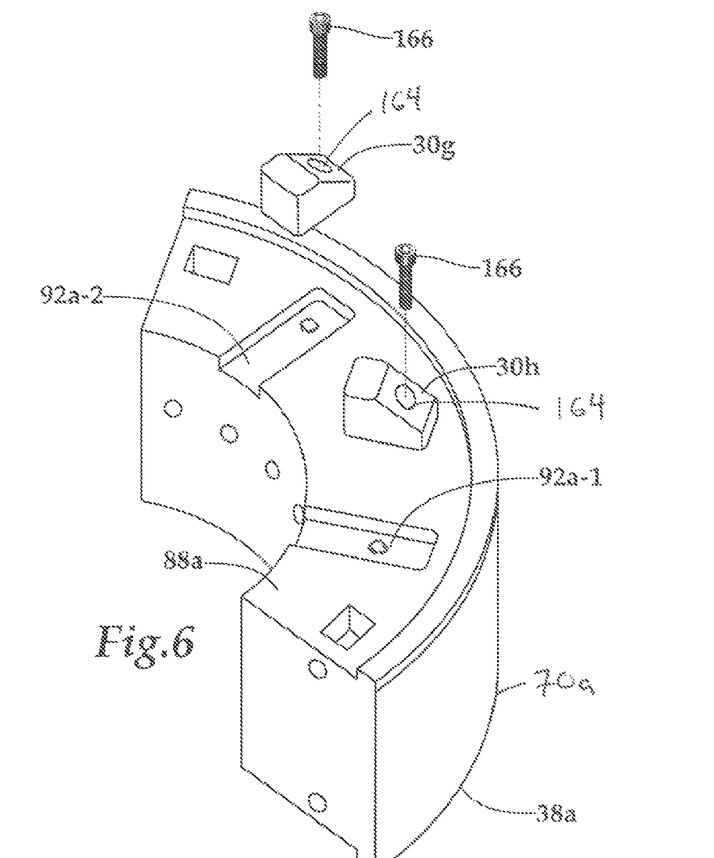
FIG. 6 is perspective view of a component of the run-flat support system presented in FIG. 5.

Radial end members 74a and 76a provide for an end-to-end mating engagement between the support segments 38a, 38b, and 38c. More specifically, the radial end member 74a includes a recess 78a and a passageway 80a. Similarly, the radial end member 76a includes a recess 82a and a passageway 84a. In operation, when radial end members of different support segments abut, the passageways align and the recesses provide for the insertion of a fastener such as a bolt, lug nut, and washer or other type of fastener 42. It should be appreciated that the use of recesses and passageways is not required by the present invention. For example (see FIG. 11), in another embodiment, radial end members of adjacent support segments may include complementary male and female portions that are operable to be disposed in mating engagement when positioned for coupling to the torque assembly.

Support segments 38a, 38b, and 38c each include first and second sides. By way of example, support segment 38a includes a disc side 86a and an inner rim side 88a. Grooves 90a-1 and 90a-2 are disposed on the disc side 86a and passageways 92a-1 and 92a-2 are disposed on the inner rim side 88A. In one embodiment, two grooves 90 per support segment 38 and two passageways 92 per support segment 38 are utilized to provide for four lateral support structures 30 per support segment 38, which is two lateral support structures 30 per side of the support segment 38. In the illustrated configuration, a total of 12 lateral support structures would be employed. It should be appreciated, however, that any number and configuration of lateral support structures may be utilized with the present invention. It should be understood that any particular number and configuration will depend on the application.

The components described herein, such as the torque assembly 32 and support segments 38a, 38b, and 38c may be manufactured from aluminum, steel, a composite material, elastomer or other material that meets the requisite load and strength requirements. It should be understood that corresponding parts of the support segments 38A, 38B, and 38C have the same number with an identifying letter, i.e., A, B, or C. Moreover, it should be appreciated that in particular embodiments, the support segments are not symmetrical as suggested by this numbering convention.

Figure 2:
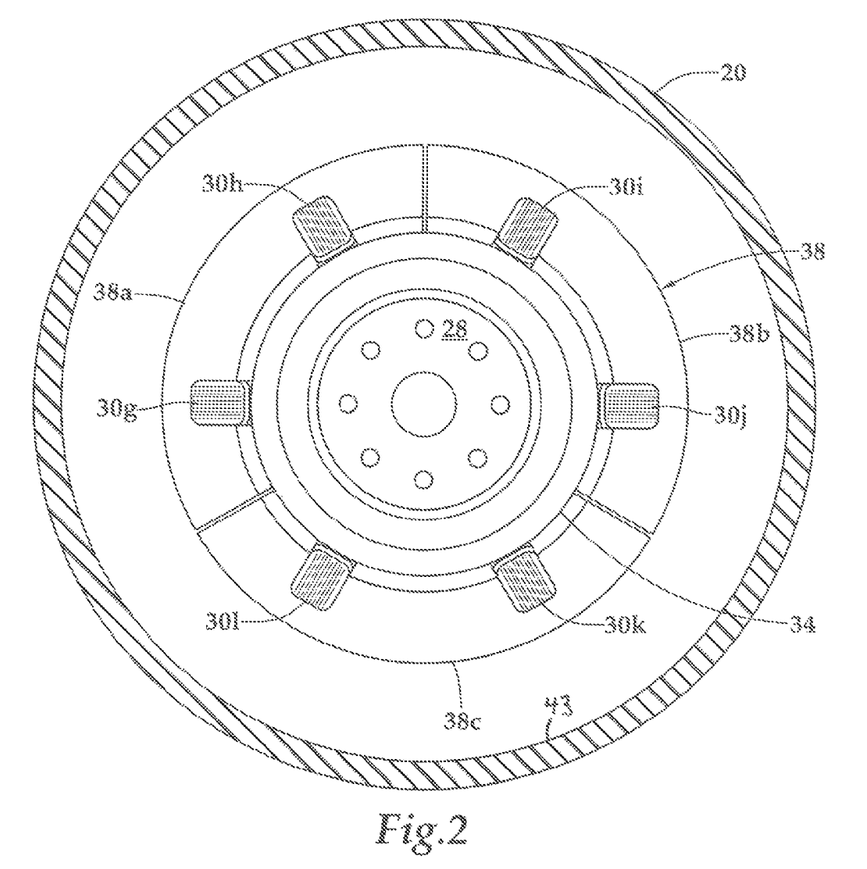
FIG. 2 is a side cross-sectional view of the run-flat support system presented in FIG. 1.
Figure 3:
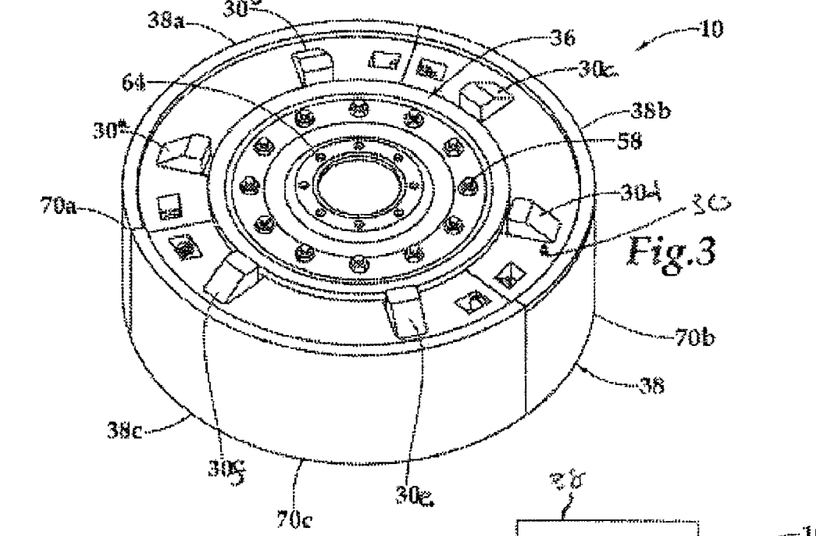
FIG. 3 is a side perspective view of the run-flat support system presented in FIG. 1, wherein the tire is removed for purposes of illustrating additional detail.
Figure 4:
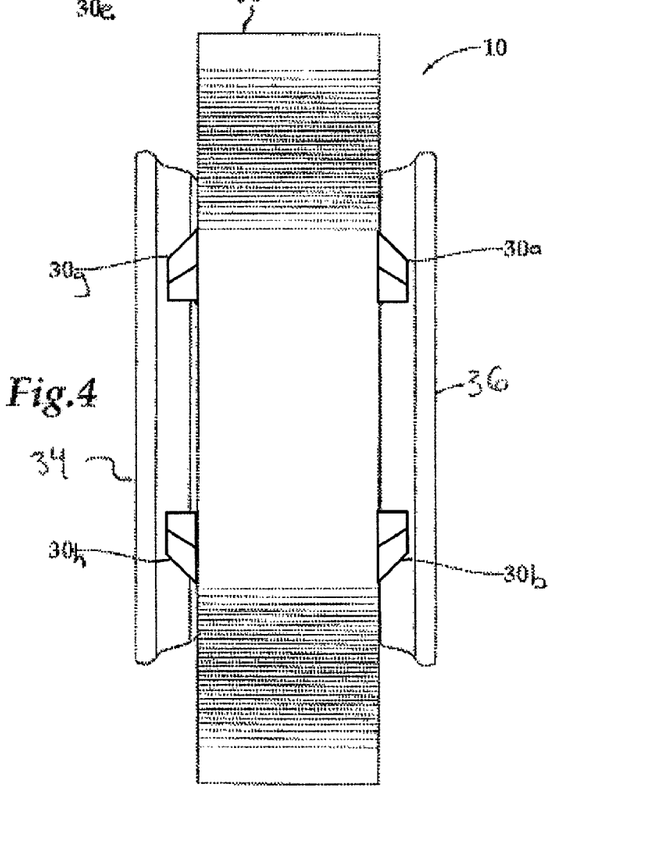
FIG. 4 is a front perspective view of the run-flat support system presented in FIG. 3.

With particular reference to FIG. 2, the lateral support structures 30 are spaced at approximately 60° intervals, and enough contact pressure may be placed against the bead of the tire to prevent the tire from slipping during high torque applications. At particular torque points, when the tire is running low inflation or during a run-flat condition, there is enough torque transfer of the tire to provide some slippage, which is desired in order to aid in the handling and control of the vehicle. Additionally, after the tire has been inflated, the lateral support structures 30 lock the tire by way of the force of the engagement of the lateral support structures to reinforce the engagement of the tire selection, the tire peripheral sealing section against the wheel bead. This prevents rotation of the tire relative to the rim during intense loading situations. As will be discussed later, when the wedge or later support structures 30 are fully engaged, the tire portion is disposed in sealing engagement with the bead of the tire rim. After inflation, the wedges are left in position and tend to reinforce the sealing engagement of the flexible tire rim or tire sidewall against the rigid wheel sealing bead. Under heavy torque conditions, the wedge opposes extension or retraction of the wheel sidewall from sealing engagement against the tire sidewall to prevent loss of pressurization.

Returning to FIGS. 2-6, the two lateral sides, i.e., the disc side 86a and the inner rim side 88a, of the support segment 38A include the grooves 90a-1, 90a-2 that are adapted for accepting flanges extending from each of the plurality of lateral support structures 30 to form the aforementioned tongue and groove joints that, in one implementation, include the grooves 90a-1, 90a-2 taking the form of T-slots. On the other side, i.e., the inner rim side 88a, passageways 92a align the with passageways of the lateral support structures 30 to provide for the coupling of the lateral support structures thereto. In practice, the lateral support structures 30 are disposed so as to be adapted for engaging the interior side walls of the tire with a narrow end and for contacting the plurality of support segments with a wide end.

As shown, in one embodiment, two different types of attachment are possible. One side of the support segments are equipped with the passageways 92 to permit pre-installation of a portion of the lateral support structures 28 and the other side of the support segments are equipped with grooves 90 for forming tongue-and-groove joints in the field. In one implementation, six lateral support structures 28 on the disc side 86 of the wheel are pre-mounted. The remaining six lateral support structures 30 on the inner rim side 88 are free to be pushed into place using the tongue-in-groove assembly.

In operation, the lateral support structures 30 push against the sidewalls which in turn push against the flanges of the wheel. The lateral support structures furnish a tire compliant bead lock that also acts as bead clutching. The hypotenuse or change in angle associated with the inclined surface of the geometric wedge shape is a natural lever to push open the sidewall of the tire. This improves performance as well as lateral and radial stability.

In assembly, support segments 38a, 38b, and 38c are positioned about the torque ring 32 such that the inner radial surfaces of the support segments are in contact with the peripheral flange 48 of the torque assembly 32 and the crowns of the support segments face the inner surface of the pneumatic tired wheel. By way of example, with reference to support segment 38C, inner radial surface 68A is positioned against the peripheral flange 48 of the torque ring 32 so that coupling holes 70C will align with coupling holes 50 and fasteners 42 may be utilized to mate the two components.

Additionally, support segments 38a, 38b, and 38c are positioned such that radial end members of adjacent support segments align. By way of example, with reference to support segments 38a and 38b, the radial end member 76a and the radial end member 74b are being disposed in a mating engagement wherein passageways 84a and 80b align so that a fastener 42, which is depicted as a bolt, may be inserted through the passageways 84a and 80b with the use of recesses 82a and 78a.

When the support segments 38a, 38b, and 38c are assembled in an end-to-end mating engagement with each other, they collectively form a substantially continuous tubular support structure that is operable to stabilize the tire tread during run-flat operation. This tubular support structure includes an interior circumference 102 that defines an area wherein the torque assembly is disposed. It should be understood that although the present invention is described as having three support segments, any number of support segments are permissible.

The coupling holes of the torque member 32 and the support segments 38a, 38b, and 38c as well as the mated radial end members assist in proper location and alignment of the support segments during assembly and installation, and also help maintain alignment of the support segments 38a, 38b, and 38c in response to side impact forces directed against the tire during run-flat operation. Further, the mated radial end members provide uniform load distribution against the tire and smooth running response during run-flat operation.

The torque assembly 32 is coupled to the split wheel rim as represented by rims 34 and 36. The torque assembly 32 is seated on the rim 34 such that the edge 52 of the torque assembly 32 sits on the drop-center surface 56 of the rim 34. Further, the mounting holes 46 of the torque assembly 32 are aligned with the mounting studs 58 which are threaded therethrough. The rim 36 is superposed onto the torque assembly 32 such that the mounting holes 62 are aligned with the mounting studs 58. In this configuration, the torque assembly 32 is interposed within the split wheel rim by being removably mounted between rims 34 and 36.

Figure 7:
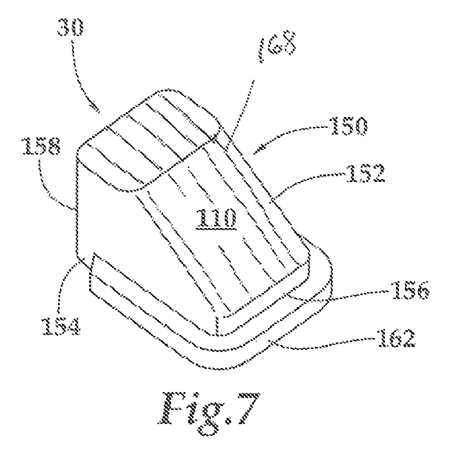
FIG. 7 is a front perspective view of one embodiment of a lateral support structure, which is a component of the run-flat support system.

FIG. 7 depicts one embodiment of the lateral support structure 30 in further detail. A geometric wedge-shape 150 includes two principal faces 152, 154 disposed in an acute angle at a narrow end 156 and an obtuse angle at a wide end 158 such that the principal face 152 defines an inclined surface 160 that connects the two ends 156, 158. A flange portion 162 is disposed about the principal face 154 to be used to form a tongue and groove joint with the support segments 38. In one implementation, the lateral support structure 30 includes an elastomeric material or polymer displaying the property of elasticity. As will be discussed in further detail hereinbelow, elastomeric materials have an appropriate spring rate which pushes the sidewall of the tire against the flange portion of the wheel. Further, elastomeric material is light while having high strength, compressible strength to weight ratio, and adequate deflection. With the use of elastomeric material it is possible to match the shore hardness of the elastomeric material to that of the interior of the tire to optimize performance.

Figure 8:
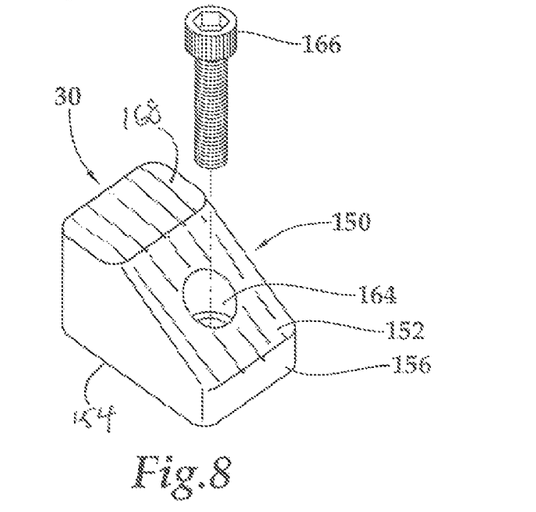
FIG. 8 is a front perspective view of another embodiment of the lateral support structure of FIG. 6a, which is a component of the run-flat support system.

With reference to FIG. 8, as will be explained in further detail hereinbelow, in one embodiment, two types of lateral support structures 30 are utilized. Similar to the previous lateral support structure 30 presented in FIG. 7, the lateral support structure 30 of FIG. 8 includes the geometric wedge-shape 150 having the narrow end 156 and the wide end 158 such that the inclined surface 160 connects the two ends 156, 158. As opposed to the flange portion 154 of lateral support structure 30 of FIG. 7 which is adapted to form a tongue and groove joint, a passageway 164 traverses the geometric wedge-shape to accept a fastener 166 such as a screw or bolt and secure the lateral support structure 30 to an inner rim side 88 of a support segment 38. Moreover, with respect to the geometric wedge-shape 150, the design may be of a scallop design that includes curved projections 166 on the inclined surface 160.

Figure 9A:
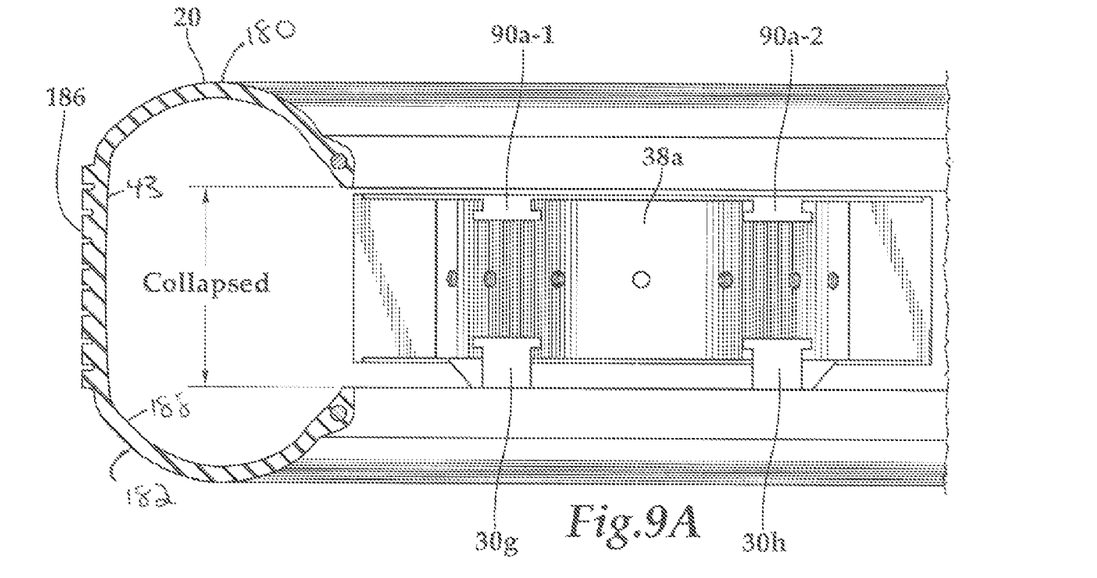
FIGS. 9A and 9B are a side cross-sectional views of the components of the run-flat support system being assembled and installed in a split wheel rim of a pneumatic tired wheel.
Figure 9B:
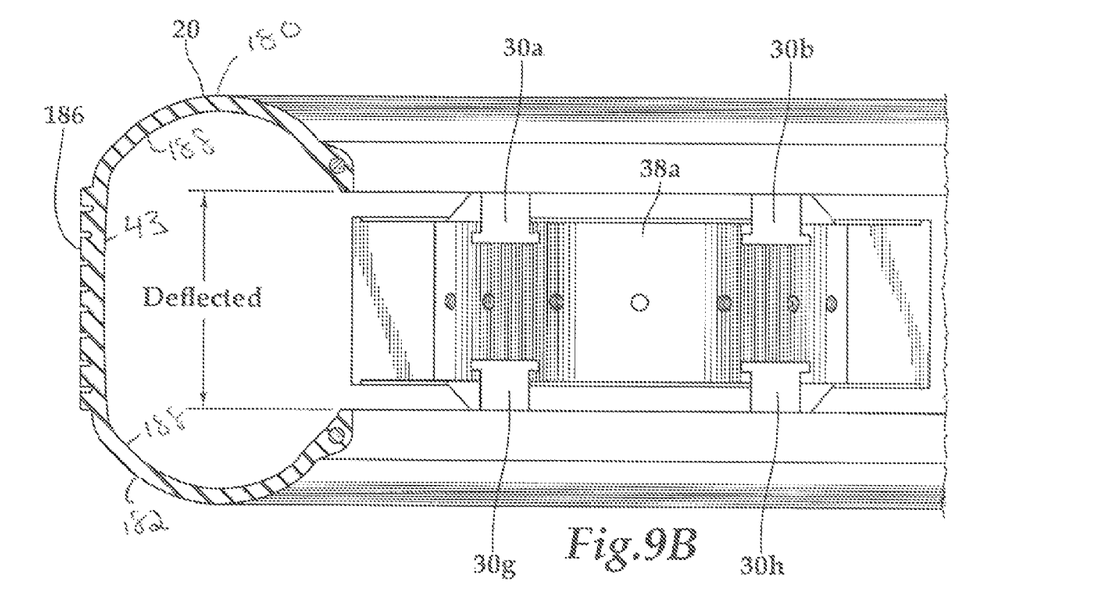

In FIGS. 9A and 9B, the components of run-flat support system 10 are being installed in a pneumatic tired wheel 20 including the tire 180 having a sidewall 182 that provides lateral stability for the tire 180, protects the inner body plies of the tire 180, and aids in maintaining the proper internal air pressure. The tire 180 also includes a tread 186 that provides traction and puncture resistance. An inner wall 188 lines the interior of the tire 180. The inner wall 116 defines the tire cavity 43 for maintaining the proper internal air pressure.

During installation, previous to the illustrated figure, a first support segment, support segment 38A, was being positioned within the tire cavity 43 such that the crown member 72A faces the inner wall 188 and an inner radial surface faces the geometric center of the tire 180. The lateral support structures assist in initial assembly of the run-flat inserts into the tire and assist with the positioning of the rim of the tire against the rim of the wheel so that a positive seal is provided, allowing the tire to be initially set up and inflated without the need for use of a sealing material such as a soap. The lateral support structures assist in providing a good, reliable seal without tools. This is particularly important with large tires, such as military tires, as this type of tire is rated for a heavy load and particularly stiff and less compliant.

The next support segment, support segment 38b, was similarly positioned within the tire cavity 43 in an end-to-end mating relationship with support segment 38a. Following the insertion of the support segment 38b, the support segment 38c was also positioned within the tire cavity 43 in an end-to-end mating relationship with both support segments 38a and 38b in order that a substantially continuous tubular support structure is formed within the tire cavity 43. To aid in the installation a high/low temperature grease may be used where appropriate.

Once the substantially continuous tubular support structure, as defined by support segments 38a, 38b, and 38c, is assembled within the tire cavity 120, the torque assembly 32 is disposed within the interior circumference 102 of the tubular structure. The torque assembly 32 and the support segments 38a, 38b, and 38c are substantially concentrically positioned with the tire 110. Additionally, as previously discussed, the coupling holes 50 of the torque assembly 32 are aligned with the coupling holes 70a, 70b, and 70c of the tubular support structure. The fasteners 42 are utilized to secure the torque assembly 32 and support segments 38a, 38b, and 38c together. A tool, such as a hand drill, may be used by an installer to tighten the fasteners 42.

As previously discussed, the support segments 38a, 38b, and 38c are coupled together in an end-to-end mating engagement with the use of fasteners, such as fasteners 42. It should be appreciated that in certain circumstances the support segments 38a, 38b, and 38c may be coupled together prior to the securing of the torque assembly 32 and support segments 38a, 38b, and 38c. The rim 34 is then secured to the torque assembly 32. The tire 20 is flipped over and the rim 34 is disposed within an opening and the mounting studs 58 of rim 34 are aligned with and threaded through mounting holes 46 of the torque assembly 32. The remaining portion of the split wheel rim, rim 36, is secured to the torque assembly and returned to the previous position.

With respect to FIG. 9B, with a hammer or mallet the lateral support structures 30 and particularly lateral support structures 30a, 30b are driven into the tongue-and-groove connection and this forces the tire sidewall radially outward into engagement with the rim of the wheel. In this manner, a reliable, airtight seal is created that furnishes an environment for pressurization of the tire without use of any sealants, soaps, or surfactants. It should be understood that depending on the tire, assembly technique, and related factors, the lateral support structures may be driven in the tongue-and-groove connections at a different point.

With the tire 180 returned to this position, the mounting holes 62 are aligned with the mounting studs 58 and the rim 36 is superposed onto the torque assembly 32 such that the torque assembly 32 is interposed between the rims 34 and 36. The exposed portions of the mounting studs 58 are able to receive tighteners, such as lug nuts and washers, to secure the split wheel rim and prepare the split wheel rim and tire 110 for mounting to an axle via mounting holes 64. It should be understood that the disassembly of the run-flat support system is accomplished in the reverse order of the methodology described herein.

Accordingly, the run-flat support system 10 presented herein assembles and disassembles by conventional hand tools without the need for any special equipment or extensive training. In field tests, 15 minutes were required to assemble or disassemble the run-flat support system. Further, the run-flat support system presented herein may be mounted on various types of conventional one piece, fixed or multi-part wheel rims and suitably secured as an OEM offering or by add-on retrofit installation. Additionally, with respect to assembly, in particular embodiments, the torque assembly is installed as an OEM offering and the support segments are added aftermarket.

FIG. 9B further illustrates a particular aspect of the installation of the run-flat support system 10. When the tire is being assembled, the tire does not have to be separated or widened. Normally, during assembly tires are closed fairly tight due to stacking. In order to place an insert within the tire, the tire must be stretched or deflected. This leads to problems trying to separate out the two sidewalls. In order to inflate the tire properly, the two sidewalls need to be pushed up against the flanges of the wheel so that the tire may be inflated. The wedge design of the lateral support structures 30 accomplishes this by being able to push against the sidewalls by the elastomeric material providing a uniform spring rate and pressure against the bead portion of the sidewall of the tire. The material characteristics of the elastomeric material are matched to the characteristics of the tire so that no impressions are made on the tire. Rather, as lateral pressure is applied, the elastomeric material deflect enough to increase the surface area and form to the tire. The opening of the tire is very narrow and the lateral support structures or wedges allow the tire sidewalls to be separated enough to contact the flanges of the wheel so that the tire may be inflated. This is true even though tires may have variations in tolerance and thickness. The pre-assembled wedges permit easy insertion as do the tongue-and-groove connections. The tongue-and-groove connections lift the sidewalls up enough to create a seal up against the flanges of the wheel for inflation.

Figure 10A:
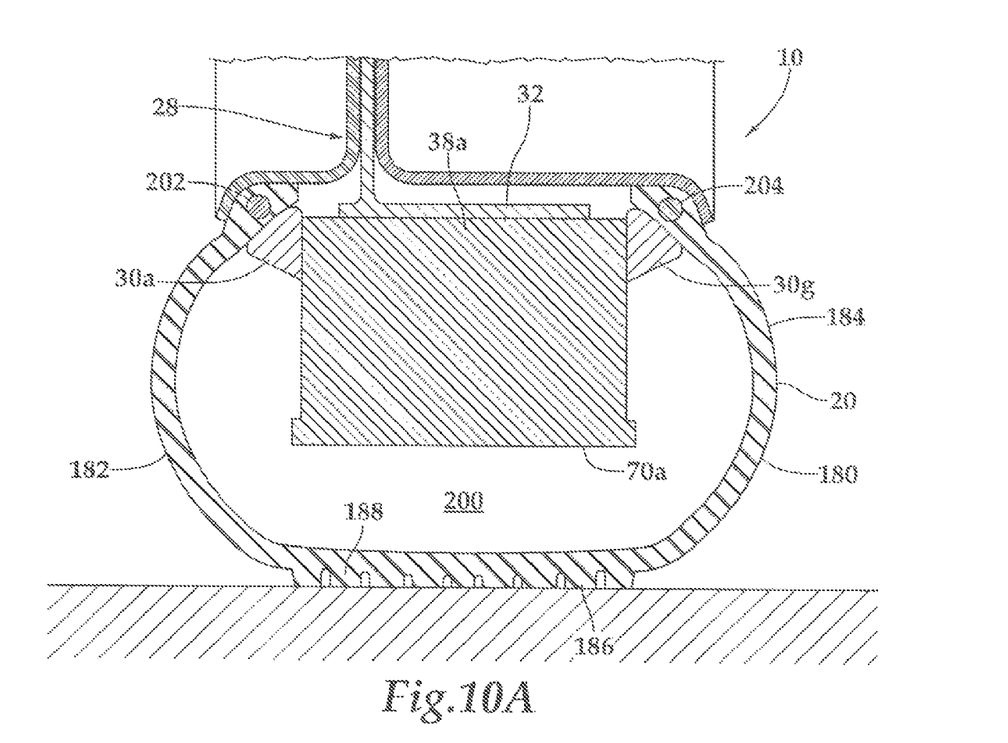
FIG. 10A is a cross-sectional view of the run-flat support system installed in an operational embodiment in a split wheel rim of a pneumatic tired wheel.

FIG. 10A depicts one embodiment of a run-flat support system 10 installed in a split wheel rim of a pneumatic tired wheel 28 which includes side walls 182 and 184, treads 186, and an inner wall 188 that defines a cavity 200. Additionally, beads 202 and 204 comprise loops of high-strength steel cables coated with rubber that provide the tire the necessary strength to stay seated on the wheel rim. The support segment 38a is mounted to the torque assembly 32 which is removably coupled to the split wheel rim. As depicted, tire 180 is properly inflated and operational. In this condition, the support segment 38a rides unobtrusively in the cavity 200 and includes a means of retaining the tire sidewalls to the wheel that laterally supports the tire sidewalls to the rim. The wedges or lateral support segments 30 are being deflected enough that it meets the contour and is compliant with the tire. During operation, there is thermo-expansion which causes the wheel to grow in width and the elastomeric material accommodates the change in thermal expansion. The wedges are wide enough to be on the side of the maximum dimensions of the wheel such that the wedges are compressed against the flange dimension of the wheel.

Figure 10B:
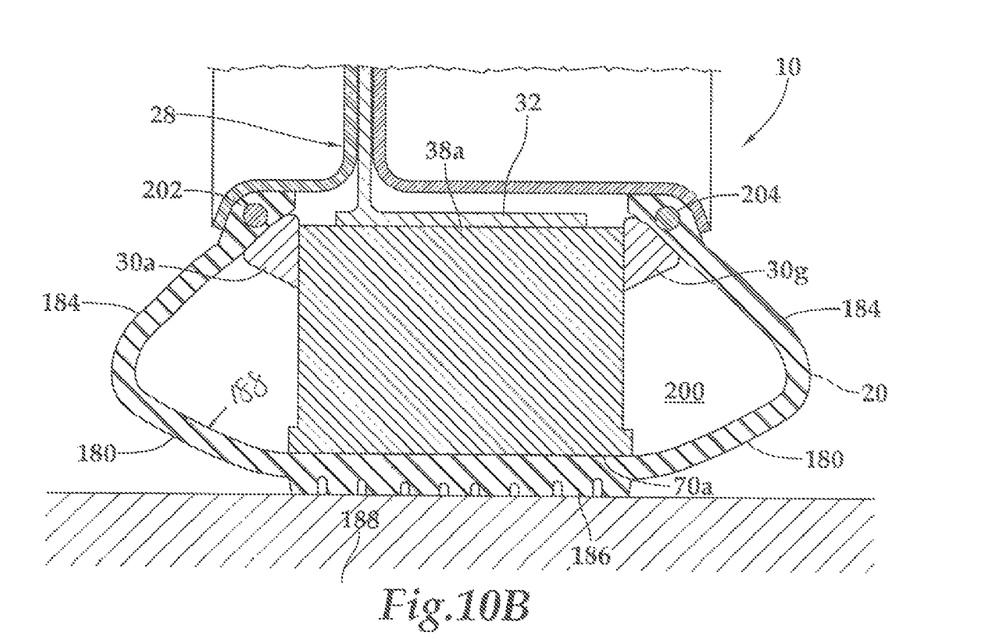
FIG. 10B depicts a cross-sectional view of the run-flat support system of FIG. 10A supporting the pneumatic tired wheel which is in a flat condition.

FIG. 10B depicts the run-flat support system 10 supporting the pneumatic tired wheel 20 which is in a flat condition. As illustrated, a crown 70a of the support segment 38a engages the inner wall 188 between the beads 202, 204 of the tire in order to support the pneumatic tired wheel and the vehicle's load in a flat condition. In particular, the crown 70a maintains an operation similar to that of inflated conditions since it is substantially centered with respect to the side walls 182 and 184. The centering is maintained even during run-flat operation when relative motion occurs between the tire sidewalls 182 and 184 and the interior components occurs.

Figure 11:
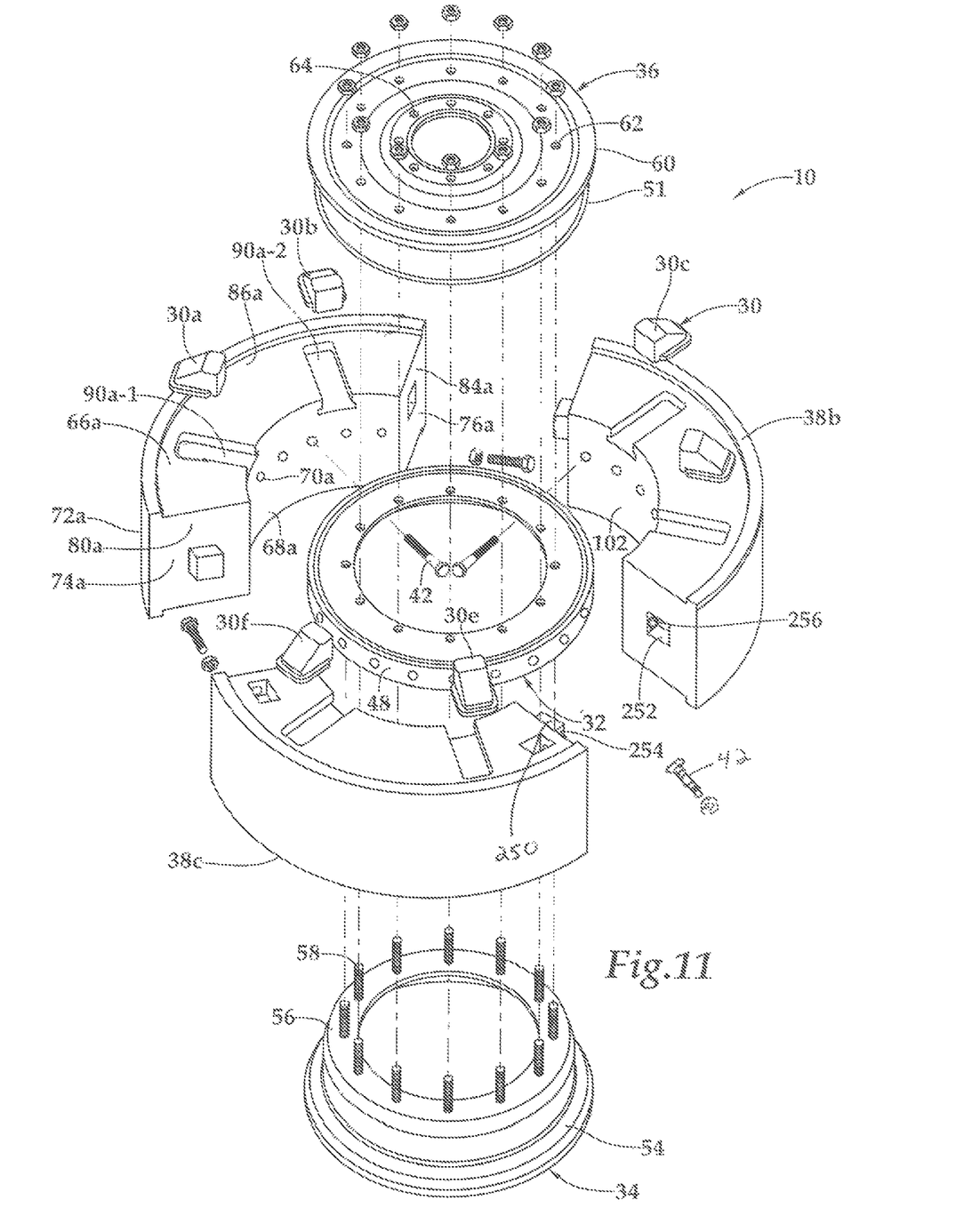
FIG. 11 depicts an alternate embodiment of the run-flat support system.

FIG. 11 depicts another embodiment of the run-flat support system 10 wherein the lateral support structures 30a through 30f, a torque assembly 32, a split wheel rim as represented by rims 34 and 36, three support segments 38a, 38b, and 38c, and fasteners 42 are shown. Here male and female connectors are utilized to connect adjacent support segments 38. In particular, a male connector 250 is inserted into a female receptacle 252 such that passageways 254, 256 are aligned for the acceptance of a faster such that the mating engagement is made therebetween.

Testing Protocol: Heat Accumulation Under Operational Load Conditions. The run-flat support system described herein was tested for heat accumulation under operational load conditions and used as a design tool to assess the thermal properties of the new design. A three support segment, run-flat support system was installed on a 37×12.5R 16.5 LT Goodyear Wrangler tire and mounted on a 16.5"×8.25" split wheel rim having 12 clamp bolts with an 8 bolt circle. The tire was inflated to a cold inflated pressure of 20 PSI, an under inflated condition, and prepared for a two stage test. At stage 1, the tire was run at 30 mph for 5 minutes. At stage 2, the tire was deflated and, a 3,500 lb load was applied, and the tire was run at 30 mph for 13 minutes. The following table, Table I, depicts the results of this heat accumulation test.

TABLE I

| FMVSS Test Results | | | | |
|---|---|---|---|---|
| | Tire Outside | Tire Center | Tire Inside | Road Wheel |
| Test Start | 108° F. | 100° F. | 110° F. | 85° F. |
| 5 Minutes | 183° F. | 180° F. | 218° F. | 93° F. |
| 10 Minutes | 237° F. | 274° F. | 238° F. | 90° F. |
| 13 Minutes | 243° F. | 290° F. | 258° F. | |

Comments
Test Suspended Tread separated from tire carcass at 13 Minutes

This test was repeated twice under similar conditions with similar results. Accordingly, the run-flat support system performed excellently as heat was not accumulated inside the tire center or in one located as would be demonstrated by a "hot spot." Rather, the run-flat support system enabled the dissemination of heat throughout the tire.

Testing Protocol: Ballistic Resistance. The run-flat support system described herein was subjected to ballistic resistance testing which is used as a design tool by manufacturers during the development and assessment of new designs with military applications. Ballistic research utilizing two different types of 50 caliber ammunition was performed. The first type of round was an Armor Piercing (AP) round and the second round was an Armor Piercing Incendiary (API) round. A single 50 caliber AP round and two API rounds were shot from a distance of 21 feet for maximum impact. All three rounds fully penetrated and exited the run-flat support system at various lateral and radial cross sections. The test demonstrated that the run-flat support system can sustain the impact of both a 50 caliber AP and API shot without causing damage to the material. The run-flat support system has the capability to allow the vehicle to continue moving after being shot. Accordingly, the run-flat support system passed the ballistic resistance test.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A run-flat support system, comprising:
a split wheel rim of a pneumatic tired wheel, the split wheel rim having complementary first and second wheel half-sections;
a torque assembly including an integral and continuous substantially circular body, the torque assembly removably interposed between the first and second wheel half-sections and coupled therebetween;
a plurality of support segments adapted for radial attachment to the torque assembly, the plurality of support segments having first and second faces opposing interior side walls of the pneumatic tired wheel, the plurality of support segments for supporting the pneumatic tired wheel in a flat condition; and
a plurality of lateral support structures secured to the first and second faces of the plurality of support segments, the plurality of lateral support structures providing a bead lock between beads of the interior side walls of the pneumatic tired wheel and the split wheel rim, the plurality of lateral support structures having a narrow end and a wide end, the plurality of lateral support structures secured to the plurality of support segments such that the narrow end of each lateral support structure in the plurality of support structures is positioned further radially outward than the wide end of each lateral support structure in the plurality of support structures.

2. The run-flat support system as recited in claim 1, wherein the plurality of lateral support structures provide an elastomeric engagement with the beads such that the beads are forcible biased into contact with the split wheel rim.

3. The run-flat support system as recited in claim 1, wherein each of the plurality of lateral support structures further comprise a geometric wedge-shape including a narrow end and a wide end, the geometric wedge-shape adapted for engaging the interior side walls with the narrow end and for contacting the plurality of support segments with the wide end.

4. The run-flat support system as recited in claim 1, wherein a portion of the plurality of lateral support structures are secured to the plurality of support segments by respective aligned passageways providing for the coupling of the portion of the plurality of lateral support structures to the support segments by fasteners.

5. The run-flat support system as recited in claim 1, wherein a portion of the plurality of lateral support structures are secured to the plurality of support segments by respective tongue and groove joints.

6. The run-flat support system as recited in claim 5, wherein the each of the plurality of support segments further comprise grooves adapted for accepting flanges extending from each of the plurality of lateral support structures.

7. The run-flat support system as recited in claim 1, wherein each of the plurality of lateral support structures comprises an elastomeric material.

8. The run-flat support system as recited in claim 1, wherein each of the plurality of support segments comprises a crown member for engaging an inner wall of the pneumatic tired wheel in the flat condition.

9. The run-flat support system as recited in claim 1, wherein the flat condition is selected from a group consisting of under-inflated conditions and deflated conditions.

10. A run-flat support system, comprising:
a wheel rim of a pneumatic tired wheel;
a torque assembly coupled to the wheel rim;
a plurality of support segments adapted for radial attachment to the torque assembly, the plurality of support segments having first and second faces opposing interior side walls of the pneumatic tired wheel, the plurality of support segments for supporting the pneumatic tired wheel in a flat condition; and
a plurality of lateral support structures coupled to the first and second faces of the plurality of support segments, the plurality of lateral support structures providing a bead lock between beads of the interior side walls of the pneumatic tired wheel and the wheel rim, the plurality of lateral support structures having a narrow end and a wide end, the plurality of lateral support structures secured to the plurality of support segments such that the narrow end of each lateral support structure in the plurality of support structures is positioned further radially outward than the wide end of each lateral support structure in the plurality of support structures.

11. The run-flat support system as recited in claim 10, wherein the plurality of lateral support structures provide an elastomeric engagement with the beads such that the beads are forcible biased into contact with the wheel rim.

12. The run-flat support system as recited in claim 10, wherein each of the plurality of lateral support structures further comprise a geometric wedge-shape including a narrow end and a wide end, the geometric wedge-shape adapted for engaging the interior side walls with the narrow end and for contacting the plurality of support segments with the wide end.

13. A run-flat support system, comprising:
a wheel rim of a pneumatic tired wheel;
a torque assembly coupled to the wheel rim;
a plurality of support segments adapted for radial attachment to the torque assembly, the plurality of support segments having first and second faces opposing interior side walls of the pneumatic tired wheel, the plurality of support segments for supporting the pneumatic tired wheel in a flat condition; and
means for retaining beads of the interior side walls of the pneumatic tired wheel to the wheel rim, the means for retaining comprising:
a geometric wedge-shape comprising:
a first narrow end and a first wide end, the means for retaining secured to the plurality of support segments such that the first narrow end is positioned further radially outward than the first wide end, and
a second narrow end and a second wide end, the second narrow end adapted for engaging the interior side walls and the second wide end adapted for contacting at least one segment of the plurality of support segments.

14. The run-flat support system as recited in claim 13, wherein the means for retaining further comprises an elastomeric material that provides a bead lock between beads of the interior side walls of the pneumatic tired wheel and the wheel rim.

15. The run-flat support system as recited in claim 13, wherein the plurality of support segments are composed of a first material and the means for retaining is composed of a second material.

16. A method for installing a run-flat support system, the method comprising:
positioning a plurality of support segments in a tire cavity of a pneumatic tired wheel having at least one tire bead positioned in a sidewall of the tire, the plurality of support segments including a first plurality of lateral support structures coupled to first faces of the plurality of support segments, each lateral support structure comprising an inclined surface;

utilizing respective inclined surfaces of the first plurality of lateral support structures to push the at least one tire bead and the sidewall of the tire axially outward;

coupling the plurality of support segments in an end-to-end mating engagement, whereby the coupled support segments form an annular support structure;

coupling a second plurality of lateral support structures to second faces of the plurality of support segments;

positioning a torque assembly within an interior circumference of the annular support structure, the torque assembly including an integral and continuous substantially circular body;

providing a spatial displacement between the plurality of support segments and an interior circumference of the tubular support structure to provide a portion of the cavity for clearance of fasteners;

using the spatial displacement to couple the plurality of support segments to the torque assembly with the fasteners;

securing a split wheel rim to the torque assembly; and providing an elastomeric engagement by way of the plurality of lateral support structures between beads of the interior side walls of the pneumatic tired wheel and the split wheel rim.

17. The method as recited in claim 16, wherein providing an elastomeric engagement by way of the plurality of lateral support structures further comprises establishing a bead lock between the beads of the interior side walls of the pneumatic tired wheel and the split wheel rim.

18. The method as recited in claim 16, further comprising providing four lateral support structures per support segment.

19. The method as recited in claim 16, further comprising positioning substantially concentrically the annular support structure and torque assembly within the tire cavity.

20. The method as recited in claim 16, further comprising mounting the split wheel rim to a High Mobility Multipurpose Wheeled Vehicle.

21. A method for installing a run-flat support system, the method comprising:

positioning a plurality of support segments in a tire cavity of a pneumatic tired wheel having at least one tire bead positioned in a sidewall of the tire, the plurality of support segments including a first plurality of lateral support structures coupled to first faces of the plurality of support segments, each lateral support structure comprising an inclined surface;

utilizing respective inclined surfaces of the first plurality of lateral support structures to push the at least one tire bead and the sidewall of the tire axially outward;

coupling the plurality of support segments in an end-to-end mating engagement to form an annular support structure;

coupling a second plurality of lateral support structures to second faces of the plurality of support segments;

positioning a torque assembly within an interior circumference of the tubular annular support structure, the torque assembly including an integral and continuous substantially circular body;

securing a split wheel rim to the torque assembly; and providing an elastomeric engagement by way of the plurality of lateral support structures between beads of the interior side walls of the pneumatic tired wheel and the split wheel rim.

22. The method as recited in claim 21, wherein providing the elastomeric engagement by way of the plurality of lateral support structures further comprises establishing a bead lock between the beads of the interior side walls of the pneumatic tired wheel and the split wheel rim.

23. The method as recited in claim 21, further comprising providing four lateral support structures per support segment.

* * * * *

UNITED STATES PATENT AND TRADEMARK OFFICE
CERTIFICATE OF CORRECTION

PATENT NO. : 8,196,629 B2  Page 1 of 1
APPLICATION NO. : 12/434614
DATED : June 12, 2012
INVENTOR(S) : William W. Gardetto It is certified that error appears in the above-identified patent and that said Letters Patent is hereby corrected as shown below:

Column 14, line 20, the phrase "tubular annular support" should read --annular support--.

Signed and Sealed this
Twenty-fifth Day of December, 2012

David J. Kappos
*Director of the United States Patent and Trademark Office*